March 11, 1930.  G. H. DAVIS  1,750,214
TIRE INFLATING DEVICE
Filed Dec. 28, 1927
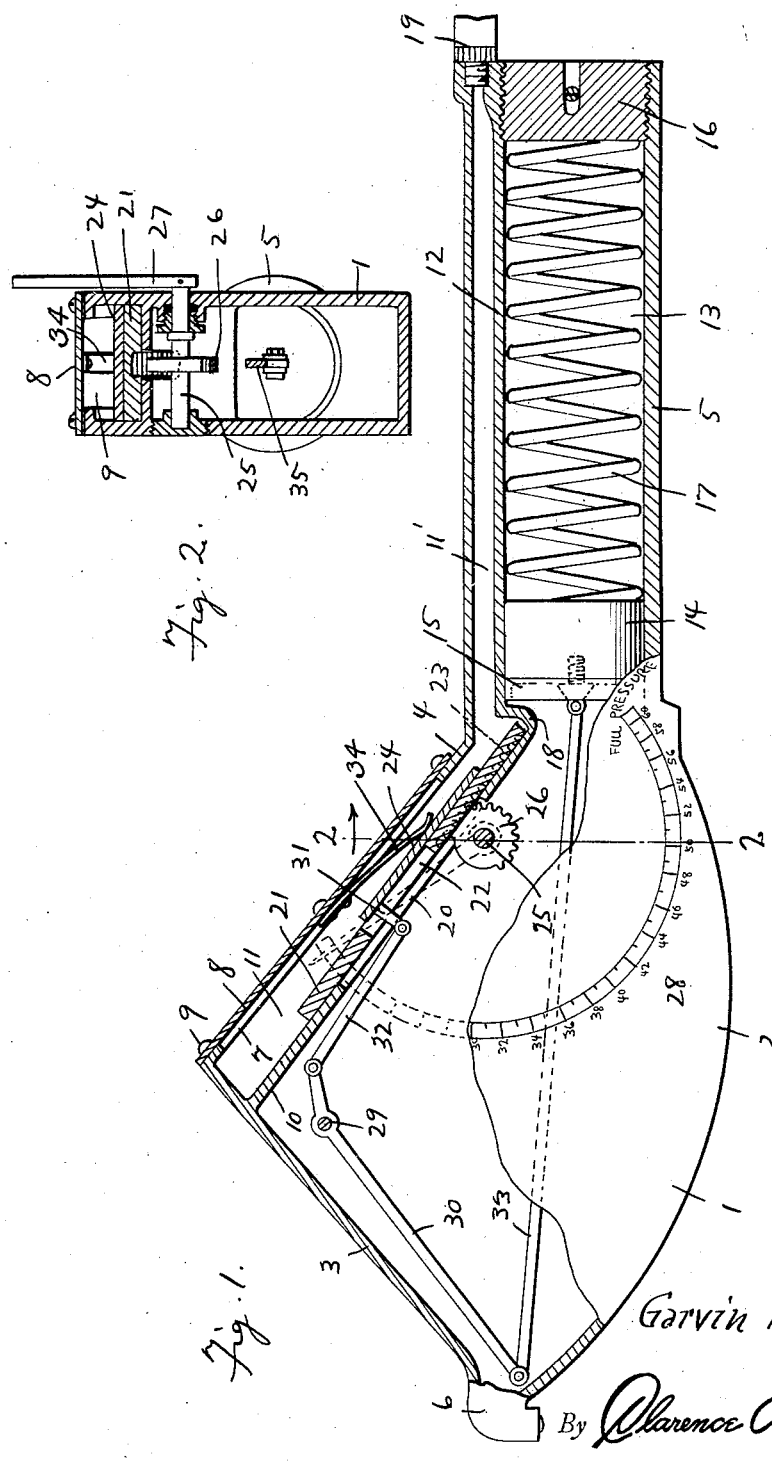
Inventor
Garvin H. Davis
By Clarence A. O'Brien
Attorney Patented Mar. 11, 1930

1,750,214

UNITED STATES PATENT OFFICE

GARVIN HOWARD DAVIS, OF HEALDTON, OKLAHOMA

TIRE-INFLATING DEVICE

Application filed December 28, 1927. Serial No. 243,064.

The present invention relates to improvements in tire inflaters and has for its principal object to provide a device for inflating pneumatic tires wherein the same includes a means for automatically cutting off the supply of air to the valve stem when a predetermined pressure in the tire has been reached.

A further object of the invention is to provide a tire inflating device of the above mentioned character wherein additional means is provided for regulating the cut off means so that said cut off means may be caused to operate at any predetermined air pressure that is selected.

A further object of the invention is to provide a tire inflating device of the above mentioned character which will at all times be positive and efficient in its operation, the same being further simple in construction, inexpensive, strong and durable and further well adapted to the purpose for which it is designed.

Other objects and advantages of the invention will become apparent from the following description when taken in connection with the accompanying drawing.

In the accompanying drawing wherein like reference characters indicate corresponding parts throughout the several views:

Figure 1 is a view partly in elevation and partly in section of the tire inflating device embodying my invention showing the parts in their normal position, and Figure 2 is a sectional view taken substantially on the line 2—2 of Figure 1 looking in the direction of the arrow.

In the drawing wherein for the purpose of illustration is shown the preferred embodiment of my invention, the numeral 1 designates a casing, the same being provided with a rounded bottom 2 and the converging forward and rear end walls 3 and 4 respectively. An elongated tubular extension 5 is formed at the rear lower end portion of the casing and this tubular extension provides a handle that is disposed horizontally.

An air outlet neck 6 is provided at the forward end of the casing for attachment to a valve stem in any appropriate manner.

The inclined rear end wall 4 of the casing is provided with the enlarged opening 7 which is normally covered by the closure plate 8, the latter being secured on the rear end wall 4 by the screws 9. The purpose of this construction will be presently described.

A partition 10 extends between the sides of the casing from the front wall 3 to a point beyond the rear end of the rear wall 4 as clearly shown in Figure 1. This partition 10 is spaced from the rear wall 4 to provide an air passage 11 in the upper rear portion of the casing, and the rear end of this partition merges with a transversely curved partition 12 that is arranged in the tubular handle extension 5 below the top portion of the handle and the space between this partition 12 and the top of the handle provides an air passage 11' that has communication with the air passage 11 in the manner clearly illustrated in Figure 1.

This partition 12 furthermore forms what I term as a cylinder 13 in the handle 5 and the forward end of the cylinder communicates with the casing 1. Operable within this cylinder 13 is the piston 14, the same having a leather cup shaped washer 15 secured on the forward side thereof for engagement with the walls of the cylinder. A plug 16 is threaded in the rear end of the cylinder 13, and this plug also provides a means for regulating the tension of the expansible coil spring 17 that is arranged within the cylinder 13 and is furthermore disposed between the rear face of the piston 14 and the plug. The expansible coil spring 17 normally urges the piston 14 forwardly in the cylinder so that the same is disposed adjacent the shoulder 18 formed at the juncture of the partition 10 with the partition 12.

The rear end of the air passage 12 is threaded for receiving the threaded nipple 19 of any conventional air hose, (not shown).

The partition 10 is formed with a longitudinally extending slot 20 in the intermediate portion thereof. Adapted for slidable movement along the upper face of this partition 10 within the air passage 11 is the plate 21, the same being slidable between the sides of the casing, as shown in Figure 2.

This plate is provided with a central longitudinally extending slot 22 that is shorter than the slot 20 formed in the partition 10, and this slot is adapted to communicate with the slot in the partition. The bottom face of the slidable plate 21 is further formed with the longitudinally extending rack 23 that extends rearwardly from the slot 22 and is also adapted for registry with the slot 20 formed in the partition 10. The purpose of this rack will be hereinafter more fully described.

Slidable along the upper face of the plate 21 is the valve forming plate 24, the same being disposed between the opposite sides of the casing as shown in Figure 2. This plate-like valve 24 is adapted to cooperate with the slot 22 formed in the lower plate 21 for covering up the slot and prevent the passage of the air from the chamber 11 into the hollow casing 1.

For the purpose of actuating the lower sliding plate 21 whereby to position said plate in any predetermined position on the partition 10, I provide a transverse shaft 25 that is journaled for rotation between the sides of the casing 1 directly below the partition plate and rearwardly of the slot formed in the plate 21. The manner in which the shaft 25 is supported in the casing is clearly shown in Figure 2. A pinion 26 is secured on the intermediate portion of the transverse shaft and the teeth of the pinion are at all times in engagement with the rack 23 formed in the bottom face of the slidable plate 21, the pinion being adapted for movement within the rear portion of the slot 20 formed in the partition 10 as clearly illustrated in Figure 1.

A hand set pointer arm 27 is secured on the outer end of the shaft 25 for disposition adjacent the outer side of the casing 1, and this particular side of the casing has formed therein a scale 28 that is graduated to indicate various amounts of air pressure. The manner in which the pointer arm cooperates with the scale is readily obvious from the construction shown in the dotted lines in Figure 1 and obviously by moving the pointer arm 27 in a counterclockwise direction, the pinion 26 will cooperate with the rack 23 to move the lower plate 21 forwardly along the upper face of the partition 10 whereby the distance between the forward end of the slot 22 formed in the plate 21 and the forward edge of the valve 24 may be regulated.

The present invention further comprehends the provision of means for automatically cutting off the supply of air to the casing and the outlet neck 6 associated therewith and to this end, there is provided a transverse shaft 29 in the upper forward portion of the casing below the partition 10. A lever 30 is secured adjacent its upper end on the shaft 29 for rocking movement. A depending finger 31 is carried by the forward end portion of the valve forming plate 24 and this finger extends downwardly through the registering slots 22 and 20. The depending finger 31 is rigidly fastened to the valve forming plate 24 by any appropriate fastening means. A link 32 affords an operative connection between the lower end of this finger 31 and the upper end of the rockable lever 30. The sliding plates 21 and 24 are retained in place through the medium of a resilient leaf spring 34 which is secured to the lower side of the cover plate 8 and has its free end portion engaged against the plate 24, as clearly illustrated in Figure 1 of the drawing. The lower end of the lever is operatively connected to the piston 14 by means of the elongated connecting rod 33.

With the parts arranged as shown in the drawing, it will be observed that the valve plate 24 does not completely cover the slot 22 formed in the plate 21 and thereby the air entering the chamber or passage 11 will be permitted to escape through the registering slots formed in the partition and slidable plate 21. The air will of course be under pressure and will be discharged through the neck 6 into the valve stem on which said neck is attached. The leather washer 15 that is associated with the piston 14 will prevent the air from entering the cylinder 13. To use the device, the operator turns the point or arm 27 so as to indicate the pressure to which it is desired to inflate the tire. The turning of the point or arm 27 will move the shiftable plate 21 forwardly to increase the opening between said plate and the slidable valve 24. The check valve 6 on the forward end of the casing 1 is then operatively connected to the tire valve and air under pressure is then admitted to said casing 1. The pressure in the casing 1 then starts to build up. This pressure will first overcome the pressure of the coil spring 17 in the cylinder 13 whereupon the piston starts moving rearwardly therein causing the valve 24 to move forwardly on the lower plate 21 and over the opening 22 therein in a manner to restrict said opening. Meanwhile, the pressure in the casing 1 and the tire keeps building up so that by the time the piston 14 has moved sufficiently rearwardly in the cylinder to close the valve, the pressure in the casing 1 and the tire will have reached that pressure for which the pointer arm 27 has been set. It is understood, of course, that the piston moves the slidable valve 24 through the medium of the rod 33, pivoted lever 30 and the connecting link 32.

It will thus be seen from the foregoing description that I have provided a novel tire inflating device that is of such size as to permit the same to be readily and easily handled, and furthermore the provision of the valve mechanism will prevent over-inflation of the tire. Furthermore, the valve mechanism will be automatic in its actuation and will furthermore at all times be positive and efficient in its operation.

While I have shown the preferred embodiment of my invention, it is to be understood that various changes in the size, shape and arrangement of parts may be resorted to without departing from the spirit of the invention and the scope of the appended claims.

Having thus described the invention, what I claim as new and desire to secure by Letters Patent is:—

1. In a tire inflating device, a casing provided with an air outlet neck, a handle extending rearwardly from the casing and providing a cylinder that communicates with the casing, a piston operable within the cylinder, an expansible coil spring for normally holding the piston in the forward end of the cylinder, a partition arranged within the upper portion of the casing for dividing the same into an upper air passage and a lower compressed air chamber, said air passage being provided with an air inlet, the partition being formed with a slot to afford communication between the air passage and the compressed air chamber, a valve forming a plate slidable over the slot and being normally so disposed as to permit air to enter the casing and be discharged through the outlet neck, cooperating means between the valve and the piston for moving the valve to completely cover the slot when a predetermined pressure is present in the casing, said last mentioned means comprising a rockable lever mounted in the casing, one end thereof being operatively connected to the valve, and a rod operatively connecting the other end of the lever with the piston.

2. In a tire inflating device, a casing provided with an air outlet neck, a handle extending rearwardly from the casing and providing a cylinder that communicates with the casing, a piston operable within the cylinder, an expansible coil spring for normally holding the piston in the forward end of the cylinder, a partition arranged within the upper portion of the casing for dividing the same into an upper air passage and a lower compressed air chamber, said air passage being provided with an air inlet, the partition being formed with a slot to afford communication between the air passage and the compressed air chamber, a plate arranged for slidable movement along the upper face of the partition over said slot, said plate being formed with a shorter slot and with rack teeth on one face thereof, a valve forming a plate slidable over the slot in said first mentioned plate, and being normally disposed as to permit air to enter the casing and be discharged through the outlet neck, a rockable lever mounted in the casing and having one end thereof operatively connected to the valve forming plate, a rod operatively connecting the other end of the lever with the piston whereby the valve forming plate may be moved to completely cover the slot in the first mentioned plate when a predetermined pressure is present in said chamber, and a manually operable pinion cooperating with the rack teeth in the slidable plate, whereby the distance between the forward end of the slot in the said plate and the adjacent end of the valve forming plate may be regulated.

In testimony whereof I affix my signature.

GARVIN HOWARD DAVIS.